United States Patent [19]
Baker

[11] Patent Number: 5,949,579
[45] Date of Patent: Sep. 7, 1999

[54] FLEXIBLE DARKNESS ADAPTING VIEWER

[76] Inventor: Gary H. Baker, 1966 Loon Rd., Fortuna, Calif. 95540

[21] Appl. No.: 08/904,621

[22] Filed: Aug. 1, 1997

Related U.S. Application Data

[63] Continuation of application No. 08/415,295, Apr. 3, 1995, abandoned.

[51] Int. Cl.⁶ ............................ G02B 23/16; G02B 21/00
[52] U.S. Cl. ......................... 359/612; 359/611; 359/601
[58] Field of Search .................................. 359/399–428, 359/510–513, 600–601, 611–614; 385/133, 147; 250/214 VT; 378/166, 174–175; 434/262–271; 40/361–367

[56] References Cited

U.S. PATENT DOCUMENTS

| | | | |
|---|---|---|---|
| 3,040,616 | 6/1962 | Simpson | 359/481 |
| 3,325,824 | 6/1967 | Donegan | 2/8 |
| 3,325,825 | 6/1967 | Christianson et al. | 2/434 |
| 4,047,806 | 9/1977 | Puel | 359/799 |
| 4,081,920 | 4/1978 | Magee | 40/362 |
| 4,249,329 | 2/1981 | Lamb | 40/361 |
| 4,250,644 | 2/1981 | Jantzen | 40/367 |
| 4,330,169 | 5/1982 | Kantor | 359/369 |
| 4,415,242 | 11/1983 | Major | 359/612 |
| 4,491,434 | 1/1985 | Barr et al. | 40/362 |
| 4,834,495 | 5/1989 | Whitehead et al. | 385/133 |
| 4,968,125 | 11/1990 | Rodriquez | 359/379 |
| 5,201,135 | 4/1993 | Cowles | 42/101 |
| 5,214,533 | 5/1993 | Moracchini | 359/367 |
| 5,225,932 | 7/1993 | Wannagot et al. | 359/611 |
| 5,361,162 | 11/1994 | Goebel | 359/411 |

FOREIGN PATENT DOCUMENTS

| | | | |
|---|---|---|---|
| 1047378 | 12/1958 | Germany | 359/600 |
| 39511 | 11/1985 | United Kingdom | 359/600 |

OTHER PUBLICATIONS

Panascope Viewer, Brochure of "Radiology Reference Guide", 1993.

Primary Examiner—Thong Nguyen
Attorney, Agent, or Firm—Depaoli & Frenkel, PC

[57] ABSTRACT

A portable viewing tunnel for transparencies, medical radiographs, mammograms and other trans-illuminated materials is presented. Its proper use provokes human physiologic darkness adaptation primarily by means of an elastic neoprene rubber laminate cylinder with a malleable distal aperture which can be manually shaped to fit the form of the dark or detailed areas of interest being viewed. This characteristic prevents light which is emanating from bright sources within or next to the trans-illuminated image from reaching the eyes and spoiling physiologic darkness adaptation. Additional steps to exclude stray light include a soft, form fitting goggle on the proximal end to contact the face around the eyes forming a light tight junction between viewing tunnel and the eyes. An intermediate lens board is included for easy changes in binocular magnifier lenses. This device replaces most of the need for bright lighting or masking for viewing dark areas on transparencies and other trans-illuminated materials. A monocular, high power lens attachment is described which offers convenient darkness adapted viewing of slides, microfilm and microfiche otherwise unaided by special microfilm reader devices.

9 Claims, 1 Drawing Sheet

FLEXIBLE DARKNESS ADAPTING VIEWER

This application is a continuation of U.S. application Ser. No. 08/415,295, filed Apr. 3, 1995, now abandoned.

BACKGROUND

1. Field of the Invention

Viewing transparencies through a hand-held dark tunnel improves visibility of shadow detail. It is particularly useful viewing medical radiographs where dark portions are commonly juxtaposed to bright areas. The dark tunnel improves visibility of detail in the dark areas of any trans-illuminated material.

2. Description of the Prior Art

The retrieval of quality information from dark portions of medical radiographs can be life saving. Retrieval of information of microscopic details is difficult also, especially in dark areas. These two problems are encountered during x-ray film analysis. They represent important parts of proper patient diagnosis. Such problems are a nuisance that interrupt the flow of work and require extra steps. Such conflict results in medical legal risk for physicians interpreting medical radiographs, especially mammograms.

Various styles of magnifying lenses have long been used to enhance viewing for fine detail in medical radiographs and other trans-illuminated materials. A magnifier lens is a prior-art component of the invention device described herein.

Dark portions of transparencies will appear black under normal lighting conditions, but often contain both detailed and larger image forms which simply cannot be seen without special viewing conditions. Four approaches have been used to deal with this problem: 1. An extra film is taken with exposure altered to lighten the shadow areas; 2. A lower contrast film is produced, either by using a different kind of film or by altering exposure and/or processing techniques. This enables a greater range of image contrast -light and dark areas- to be squeezed into the visible gray scale. With greater contrast scale, contrast resolution suffers reducing the distinction of interfaces between nearby structures of similar shades of gray; 3. The intensity of light transmitted through the dark areas of the film is increased. A "bright light" is the traditional and most commonly used device for examining dark areas on the films, but it requires time consuming manipulation of film and light. A circus of hands, feet, films, magnifier lenses and bright lights can be inspired, especially if attempting to dictate the findings simultaneously. Intense heat associated with the bright light has damaged many a film; 4. Electronic image enhancements exist using either night-viewing photo multiplier devices or by digitizing the images and making them amenable to manipulation of brightness, contrast, magnification and central gray level. Expensive, cumbersome and impractical for now, soon digitization will become the most common solution to the problems described.

A fifth solution to the problem is presented as the background of the invention herein. By providing an environment where visual darkness adaptation is provoked biochemically in the retina and by reflex dilation in the pupil, exceedingly weak light intensities can be detected by the human eye to distinguish form and detail. We have all experienced this phenomenon each time we step from a brightly lit room into what at first seems the total darkness of night. We must wait a minute to see. Soon we dark adapt and can usually find enough light to see. Reflex pupil dilation is rapid. Biochemical changes in the retina take longer, but can be used to advantage in situations where the extra time required is important.

Visual darkness adaptation is important to viewing weakly trans-illuminated images. Such adaptation is a long standing tradition encountered in theaters, in TV rooms, at slide presentations and in x-ray reading rooms. It has been accomplished by turning lights down or off; or by throwing a dark shroud over the head and the viewing screen to exclude ambient light; or by placing opaque covers over bright portions of the viewing area (masking). Darkness adaptation is also traditionally applied to x-ray viewing. Commonly it is provoked by monocular viewing of dark parts of a transparency through an open ended opaque tunnel positioned such that the bright portions of the viewing area are excluded from the tunnel opening. Probably since the first radiographs were produced by Wilhelm Roentgen 100 years ago, dark x-ray images were viewed by looking with one eye down an opaque dark tunnel. The tunnel is most commonly fashioned by rolling up a handy nearby x-ray film into a tube.

Manufactured instruments have been produced over the years that take advantage of darkness adaptation and magnification for viewing transparencies. A few are binocular. A popular model of such an instrument exists for x-ray viewing, the Panascope Viewer (Andover, Conn.). Optics physics limits binocular magnification for viewing at a reasonable working distance to about 3.5 power.

The Panascope Viewer provides both magnification and darkness adaptation. It has a rectangular cross section. It is constructed from rigid durable plastic through-out. It is molded proximally only generally to conform to the face and nose to cover both eyes. Though quite helpful, the Panascope suffers from several deficiencies.

It is rigid.

Its rigid proximal end does not fit snugly against the face. Considerable light leaks in between the face and the proximal end of the Panascope. Such ambient light at least partially defeats darkness adaptation.

Also its distal end is rigid and the distal opening cannot be made smaller or shaped to fit the dark portions on the trans-illuminated images. Thus, it is usually impossible to exclude any bright areas which also lie within the Panascope field of view near the dark area of interest. The forced inclusion of these bright areas blinds the eye and prevents optimal darkness adaptation.

Its rigid, one piece construction makes it difficult to reach the deeply placed magnifying lens to clean it or change it to a different magnification strength or lens type.

Its hard plastic is resistant to paint or multicolor dye decoration. It clatters when it falls. Though a very tough plastic, it could break on impact on a hard floor.

Several objects and advantages of the present invention are:

(a) A new use of inexpensive pliable welder's goggle to provide a soft, light-tight fit for effective light exclusion of ambient light where the proximal end of the viewing tunnel contacts the face. At the distal surface, the existing goggle has a slidable mount intended to hold dark safety glass and permit changing and cleaning of this glass. The slidable mount is suitable for easily attaching and detaching a simple custom manufactured opaque rigid oval lens board on which a magnification lens is mounted. Suitable binocular and monocular magnification lenses currently exist.

(b) Soft, elastic neoprene rubber/cloth laminate (wet suit material) is fabricated into an open ended opaque viewing cylinder. The neoprene laminate viewing cylinder uses its elastic properties to be stretch mounted over the perimeter of the oval lens board providing a continuous dark viewing tunnel formed by the goggle proximally and the neoprene cylinder distally, joined by the intermediate oval lens board. (a) and (b) describe a four part design whereby:

(c) the opaque elastic neoprene laminate viewing cylinder can be attached and detached easily over the lens board perimeter. The alignment and length of the neoprene laminate viewing cylinder can be slidably adjusted over the lens board perimeter to match various magnification focal lengths and other desirable viewing conditions. Its distal opening can be folded into a cuff to further expand its versatility.

(d) The distal end of the neoprene laminate viewing cylinder can be manually distorted from its baseline oval shape to conform to the shape of the dark area on the transparency excluding nearby bright areas which detract from human darkness adaptation. The magnitude of the viewing advantages provided by the distal aperture shaping means is difficult to perceive until personally experienced.

(e) The neoprene laminate viewing cylinder is supplied in many patterns and colors and can be easily dyed or painted with multi color designs.

(f) Being light in weight and imbued with a soft, non-slippery surface, the neoprene laminate viewing cylinder, lens board and welder's face goggle fall quietly and harmlessly onto hard surfaces. It is easy to pick up and easy to hold up. It can be hand held or mounted with a headband.

(g) The removable neoprene laminate viewing cylinder and slidably removable lens board provide for ease in dismantling for lens cleaning or lens changing or for substitution of a special purpose high power lens described below.

(h) The specialty high power lenses combine with the light shielding properties of the welder's goggle to permit darkness adapted viewing of slides, microfilm and microfiche while they lie against a simple light box bypassing the need for large microfilm projection viewers.

(i) One or several different lenses or special viewing devices, each mounted on a separate lens board, can be quickly changed using the slidable attachment indigenous to the welder's goggle as currently manufactured. Since the goggle is suitable as it exists, manufacturing savings can be realized.

Further objects and advantages will become apparent from a consideration of the ensuing description and drawings.

SUMMARY OF THE INVENTION

The present invention is directed to a darkness, adapting viewer for provoking visual darkness adaptation of the human eye to facilitate the viewing of trans-illuminated material such as medical radiographs. The darkness, adapting viewer of the present invention is particularly effective in the retrieval of quality information from dark areas of medical radiographs which could otherwise be missed by medical personal reading the radiographs.

The darkness, adapting viewer has a tunnel configuration with a proximal open end with a lens for viewing the trans-illuminated material by a user and has an open distal portion associated with the lens extending beyond the lens which may be brought close to the trans-illuminated material to be viewed. The distal portion or the field-of-view end is flexible such that it can be distorted from the baseline shape by the user to conform to an area of the trans-illuminated material to be viewed.

Advantageously, the flexible distal portion of the darkness, adapting viewer permits the user to exclude adjacent trans-illuminating light which may interfere with observing or reading the trans-illuminated material thus, preventing or significantly reducing the chances of error in interpreting the trans-illuminated material. Another advantage of the darkness, adapting viewer of the present invention is the soft light-tight fit of the open proximal end with the users face which effectively excludes undesirable ambient light from the proximal end during viewing. Such ambient light can interfere with the proper interpretation of the trans-illuminated material being viewed.

The darkness adapting viewer of the present invention contains a lens for magnification of the trans-illuminated material to be viewed. Advantageously, the lens can be adjusted in the adapting viewer to change the magnification focal lengths to better view the trans-illuminated material.

DETAILED DESCRIPTION OF THE INVENTION

Figure 1:
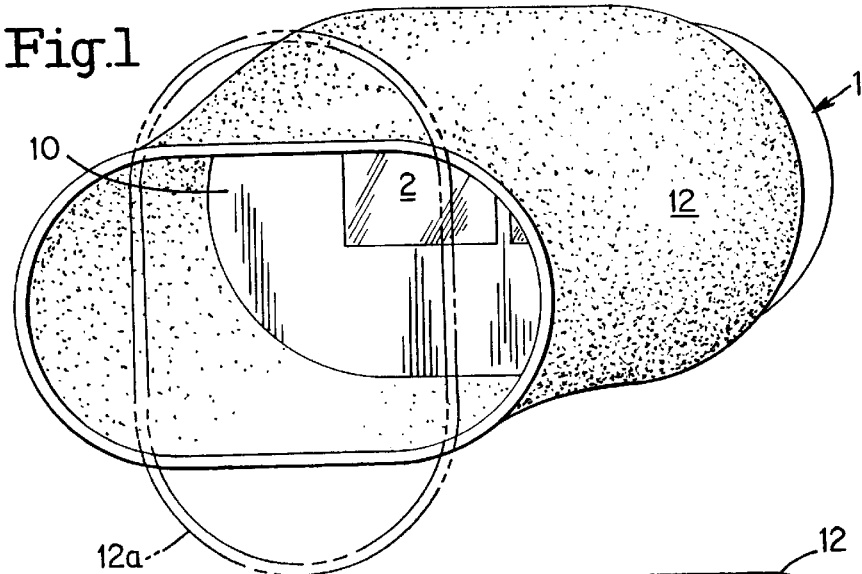
FIG. 1 illustrates the darkness, adapting viewer from the open distal portion with a phantom line illustrating the flexibility of the viewer.
Figure 2:
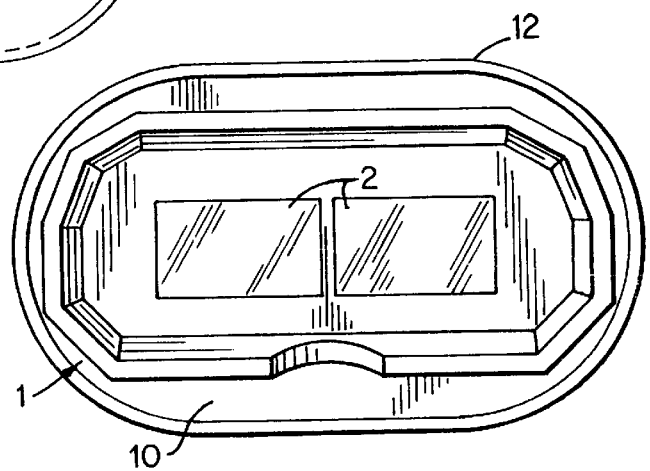
FIG. 2 illustrates the darkness, adapting viewer from the open proximal end disclosing welder's goggles and magnifier lenses.
Figure 3:
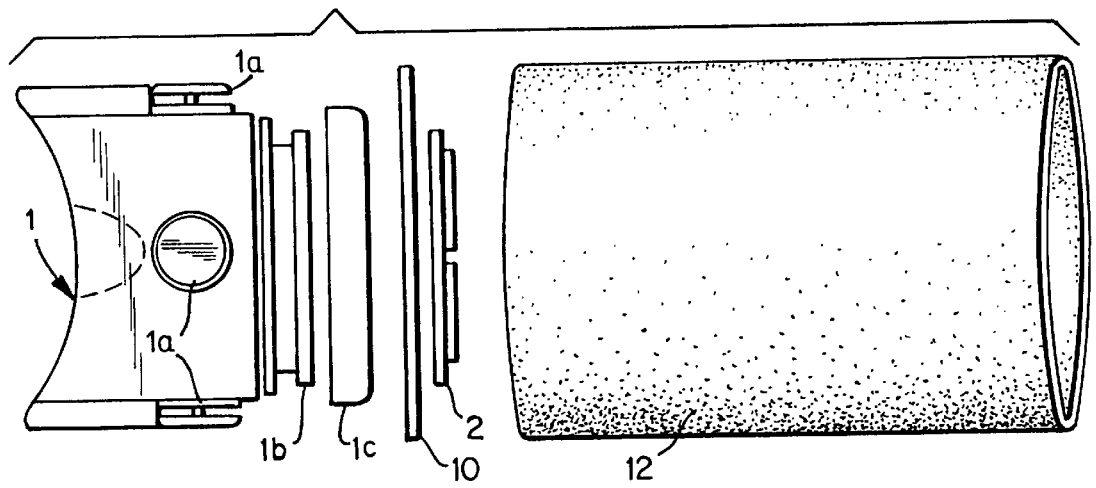
FIG. 3 illustrates a top view of the disassembled darkness, adapting viewer disclosing the flexible cylinder lenses and lens board and welder's goggles.

FIGS. 1–3 depict a design for a viewing tunnel used to examine dark forms and detail in trans-illuminated materials. The design is based on a new use for existing manufactured welder's goggle and magnifier lenses and neoprene/cloth laminate (wet suit) material. These three components are connected together by a fourth component, an unbreakable opaque lens board. Together these components provide a darkened viewing tunnel which fits the face light-tight on one end and has a malleable and conformable opening on the opposite end, the field-of-view end. The field-of-view end is positioned in contact with or very near to the surface of the trans-illuminated film or material.

FIG. 1 shows the appearance of the assembled device as a perspective from the field-of-view end of the device.

FIG. 2 shows a direct "en face" view into the face goggle end of the device. The obvious large oval structure is the lens board. The thin outline around the lens board is the neoprene rubber cylinder stretch fitted over the perimeter of the lens board. Centrally one sees the magnifier lens in the opening of the welder's goggle.

FIG. 3 shows a top view of the disassembled device. To manufacture the goggle window frame, the lens board and the magnifier lens are fastened against one another. The distal goggle window is slidably attached to the goggle window frame/lens board. Finally, the neoprene rubber cylinder is stretched and drawn over the perimeter of the oval lens board.

Reference Numerals in the Drawings

| | |
|---|---|
| 1 | Welder's Goggle |
| 1a | Goggle Ventilators |
| 1b | Goggle Window Carrier, with slidable connector |
| 1c | Goggle Window Frame, with mated connector. |
| 2 | Binocular Magnifier Lens |
| 10 | Lens Board |
| 12 | Neoprene Laminate Viewing Cylinder |
| 12a | Phantom Lines illustrating flexibility of distal portion |

FIGS. 1–3 depict a small, handholdable device for viewing trans-illuminated materials. The device provides magnification and a light-tight tunnel to provoke darkness adaptation. When viewing weakly illuminated areas, the viewing tunnel device provokes physiologic darkness adaptation even in environments where bright sources of light exist nearby. The device is novel in its a.) proximal provision of a soft, light-tight fitting face goggle as a means to completely exclude ambient light, a design principle formerly incorporated into diving masks and welding goggles, but not formerly incorporated into transparency viewers or x-ray viewers; and b.) distal provision of a flexible viewing opening as a means for closely shaping the field-of-view to match the shape of dark areas of viewing interest while excluding bright blinding sources of adjacent trans-illuminating light.

The design is based on a new use for existing manufactured welder's goggle 1 and plastic magnifier lens 2. Neoprene rubber/cloth laminate (wet-suit) material is used to form the opaque viewing cylinder 12, with the black, non-reflective material on the inside and color or pattern of choice on the outside. These three components are connected by a fourth component, an unbreakable opaque lens board 10.

These components provide a dark viewing tunnel with light-tight walls. The tunnel fits the face light-tight on its proximal welder's goggle end. It has a malleable and conformable opening on the field-of-view end because this distal end is made from the neoprene laminate (wet-suit) material.

Welder's goggle 1 is made of a soft pliable rubber/plastic which is soft and molded to conform light-tight when pressed gently against a human face. Welder's goggle 1 comes with light-defeating goggle ventilators 1a which are unimportant and would be deleted except for the expense of building a new manufacturing mold. Welder's goggle 1 has an attached distal window assembly which is made to contain dark safety glass seated in goggle window carrier 1b and prevented from falling out by a goggle window frame 1c which slidably mates with goggle window carrier 1b. Goggle window carrier 1b is permanently fastened light-tight to the body of welder goggle 1. The dark safety glass is removed from welder goggle window carrier 1b and it is left empty. Manufactured lenses exist which fit in welder goggle window carrier 1b that are a little too close to the eyes to yield a good working distance. However, this is a potential ramification design.

The welder goggle window frame 1c is attached to oval lens board 10 and existing manufactured lens 2 from Donegan Optical Company, Inc. (Lenexa Kans.). (see FIG. 3). Since they are cheap, several pre-assembled window frame/lens board/lens combinations can be kept available each with a different purpose lens on its lens board. The window frame/lens board/lens combination assemblies can be slidably mounted and dismounted from welder goggle 1.

Neoprene rubber viewing cylinder 12 is fabricated with an oval cross sectional circumference slightly less than the outer circumference of lens board 10. Using only the strong elastic properties inherent in neoprene rubber viewing cylinder 12, its proximal opening is stretch-fitted over the perimeter of lens board 10, holding it firmly, but allowing easy detachment. This simple elastic mount allows adjustment of the viewing length of neoprene rubber viewing cylinder 12 to suit the user's preference or to adjust to the new focal length dictated by a change of lens. The soft neoprene rubber viewing cylinder 12 can be folded distally 12a or proximally into a cuff to increase the range of possible adjustments to its length. Finally, if desired, the end user can cut neoprene rubber viewing cylinder 12 to a different desired length with a pair of scissors.

The viewing tunnel device is picked up by one hand of the user and pressed gently to the face so the eyes can view down the tunnel and the nose can breath outside the face goggle. Light can only enter through the distal opening of the viewing tunnel. The distal opening of the viewing tunnel is brought close to the troublesome portion (dark or detailed or both) of the trans-illuminated material (x-ray, mammogram, photo transparencies, fabric, etc.) in order to:
a. exclude ambient or nearby trans-illuminated bright light, and b. to enter the focal zone of the magnification lens.

If the desired area to view is troublesome due to inherent darkness and there is an interfering bright area of blinding light adjacent to it, the user's other hand temporarily shapes the distal opening so that the viewing tunnel's field-of-view matches the shape of the dark area excluding the adjacent bright areas, and permitting optimum physiologic darkness adapted viewing.

Lenses can be changed, lens 2 and lens board 10 detaching at mated slidable mounts on welder goggle window frame 1c and welder goggle window carrier 1b, allowing binocular magnification up to 3.5× and monocular magnification up to 10× for viewing trans-illuminated slides, microfilms or microfiche unaided by the usual projection equipment.

The device can be used for magnification without darkness adaptation by detaching said neoprene laminate viewing cylinder 12.

The viewing tunnel device described herein is useful in viewing x-rays and other trans-illuminated materials, providing magnification and effective darkness adaptation. It is novel because a.) a soft, light-tight, face-fitting goggle formerly incorporated into diving masks and into welding goggles is being incorporated as a new use into a trans-illumination viewer/x-ray viewer; and b.) a flexibility means is incorporated into the distal viewing tunnel opening. The opening can be shaped 12a to the weakly illuminated area of interest, excluding blinding bright areas.

The viewing tunnel device consists of an inexpensive pliable existing welder's goggle 1 to provide soft face fit and effective light exclusion proximally. The goggle 1 is manufactured with a slidable mount at it's distal end (FIG. 3) used in the present invention for attaching existing binocular magnification lenses (or an accessory monocular high power lens for reading microfilm). The mated portion of the existing slidable goggle mount and a lens are mounted on a custom opaque rigid lens board 10. A soft, elastic, opaque neoprene laminate viewing cylinder (wetsuit material) 12, open at both ends, uses its elastic properties to be stretch-mounted over the perimeter of the oval lens board 10, completing a continuous viewing tunnel providing darkness adaptation and magnification. The viewing tunnel is formed by the goggle proximally and the neoprene laminate viewing cylinder distally joined together by means of an intermediate lens board 10. The soft neoprene opening can be distorted 12a, conformed and/or partially closed off in order to include only the dark or detailed target areas in the field-of-view effectively excluding brighter parts of the image which would defeat darkness adaptation.

Ramifications for adjusting the viewing tunnel's field of view to match the shape of the dark area to be viewed include: 1. flexible or rigid attachments to cover portions of an otherwise rigid field of view, such attachments fashioned with various sizes and shapes of holes to restrict the field of view; 2. an iris diaphragm type mechanism to adjustably restrict the field of view; and 3. sliding masks at the distal opening to shape or cone-down the field-of-view. Though not infinitely conformable and therefore less desirable, I feel these ramifications could be embraced by my claim to the novelty of an adjustable field of view.

Ramifications anticipated for the light-tight face-fit fit would include substitution of any suitable soft flexible material for the welder's goggle used herein. For example, simply sawing off the proximal and distal ends of the viewing tunnel of the Panascope Viewer (Andover, Conn.) and covering it with a sleeve of wet-suit neoprene, the flexible field of view and a light-tight face-fit could be accomplished.

While the improvements claimed herein are primarily developed to solve problems while reading medical x-rays, the scope of use of the described improved viewing tunnel will include any trans-illuminated material which needs to be viewed in detail. Such materials include, but are not limited to, photo transparencies of various sizes, fabrics, windows, and video or CRT screens.

I claim:

1. A darkness, adapting viewer for provoking visual darkness adaptation to facilitate viewing trans-illuminated material, the darkness, adapting viewer comprising a lens for viewing the trans-illuminated material by a user and a flexible open distal tunnel portion associated with said lens and extending beyond the lens, said distal tunnel portion can be distorted from a baseline shape to conform to an area of the trans-illuminated material to be viewed so as to exclude adjacent trans-illuminating light.

2. The darkness, adapting viewer of claim 1, including a proximal end relative to the lens, said proximal end providing a soft, light-tight fit on the face of the user to effectively exclude ambient light at the proximal end during viewing of the trans-illuminated material.

3. The darkness, adapting viewer of claim 1, wherein said distal tunnel portion is opaque.

4. The darkness, adapting viewer of claim 1, wherein said distal tunnel portion is composed of rubber.

5. The darkness, adapting viewer of claim 1, wherein the distal tunnel portion can be adjusted over the lens.

6. A method of viewing trans-illuminated material. by employing a darkness, adapting viewer, the darkness, adapting viewer having a lens for viewing the trans-illuminated material, a flexible distal open tunnel portion associated with said lens and extending beyond the lens to be brought close to the trans-illuminated material for viewing, and a proximal end to receive the face of the user, the steps comprising:

(a) contacting the proximal end of the darkness adapting viewer with the face of the user to provoke visual darkness adaptation;

(b) bringing the flexible distal portion of the darkness, adapting viewer close to the trans-illuminated material to view a desired area of the trans-illuminated material; and (c) distorting the flexible distal portion of the darkness, adapting viewer to conform to the area to be viewed and effectively excluding adjacent trans-illuminating light from the area to be viewed.

7. The method of claim 6, wherein the flexible distal tunnel portion of the darkness, adapting viewer is composed of rubber.

8. The method of claim 6, wherein the trans-illuminated material comprises x-rays, mammograms, photo-transparencies, fabrics, video screens, CRT screens or windows.

9. The method of claim 6, wherein said proximal end is soft to provide light-tight contact with the face of the user.

* * * * *